US011394683B2

(12) United States Patent
Bai

(10) Patent No.: US 11,394,683 B2
(45) Date of Patent: Jul. 19, 2022

(54) DOMAIN NAME RESOLUTION METHOD AND APPARATUS BASED ON A PLURALITY OF AVAILABILITY ZONES AZ

(71) Applicant: HUAWEI CLOUD COMPUTING TECHNOLOGIES CO., LTD., Gui'an New District (CN)

(72) Inventor: Pingchang Bai, Chengdu (CN)

(73) Assignee: Huawei Cloud Computing Technologies Co., Ltd., Guian New District (CN)

( * ) Notice: Subject to any disclaimer, the term of this patent is extended or adjusted under 35 U.S.C. 154(b) by 0 days.

(21) Appl. No.: 17/111,091

(22) Filed: Dec. 3, 2020

(65) Prior Publication Data
US 2021/0092090 A1 Mar. 25, 2021

Related U.S. Application Data

(63) Continuation of application No. PCT/CN2019/083614, filed on Apr. 22, 2019.

(30) Foreign Application Priority Data

Jun. 4, 2018 (CN) .......................... 201810565417.0

(51) Int. Cl.
*H04L 61/4511* (2022.01)
*H04L 43/10* (2022.01)
(Continued)

(52) U.S. Cl.
CPC .......... *H04L 61/1511* (2013.01); *H04L 43/10* (2013.01); *H04L 47/125* (2013.01);
(Continued)

(58) Field of Classification Search
CPC ........... H04L 61/1511; H04L 29/12066; H04L 67/1002; H04L 2029/06054;
(Continued)

(56) References Cited

U.S. PATENT DOCUMENTS 8,255,528 B2 * 8/2012 Raja ................. H04L 29/08144
709/224
9,116,752 B1 * 8/2015 Petit-Huguenin ....... G06F 9/505
(Continued)

FOREIGN PATENT DOCUMENTS

CN 101494659 A 7/2009
CN 101710905 A 5/2010
(Continued)

OTHER PUBLICATIONS

"How Health Checks Work in Complex Amazon Route 53 Configurations," XP055807970, Total 7 pages (Dec. 19, 2017).

*Primary Examiner* — Tonia L Dollinger
*Assistant Examiner* — Linh T. Nguyen
(74) *Attorney, Agent, or Firm* — Leydig, Voit & Mayer, Ltd.

(57) ABSTRACT

The present disclosure provides a domain name resolution method and apparatus based on a plurality of availability zones (AZ). After receiving, from a client, a domain name resolution request including a domain name of a to-be-accessed resource, a domain name system (DNS) determines, from a plurality of AZs corresponding to the domain name, a first AZ in a service available state, where each of the plurality of AZs is capable of providing the to-be-accessed resource, and then sends an internet protocol (IP) address of the first AZ to the client. In this way, the DNS processes the domain name resolution request sent by the client. After receiving the domain name resolution request sent by the client, the DNS feeds back, to the client, an IP address that is of an AZ in the service available state and that corresponds to the domain name resolution request.

12 Claims, 7 Drawing Sheets

(51) Int. Cl.
*H04L 47/125* (2022.01)
*H04L 61/5007* (2022.01)
*H04L 101/69* (2022.01)
*H04L 9/40* (2022.01)

(52) U.S. Cl.
CPC ........ *H04L 61/2007* (2013.01); *H04L 61/609* (2013.01); *H04L 63/0209* (2013.01)

(58) Field of Classification Search
CPC . H04L 67/1021; H04L 43/0811; H04L 43/10; H04L 29/12207; H04L 61/20; H04L 67/1038; H04L 2463/141; H04L 67/1012; H04L 43/08; H04L 43/0805; H04L 67/1008; H04L 41/5009; H04L 67/1029; G06F 3/067; G06F 3/0683; G06F 2209/504; G06F 9/5072
See application file for complete search history.

(56) References Cited

U.S. PATENT DOCUMENTS

| | | | | |
|---|---|---|---|---|
| 2003/0037143 | A1* | 2/2003 | Kapoor | H04L 61/35 709/219 |
| 2006/0112176 | A1* | 5/2006 | Liu | G06F 15/173 709/245 |
| 2008/0049786 | A1* | 2/2008 | Ram | H04L 67/1029 370/468 |
| 2008/0133738 | A1* | 6/2008 | Knauerhase | H04L 51/04 709/224 |
| 2008/0163064 | A1* | 7/2008 | Swildens | H04L 67/101 715/736 |
| 2010/0042725 | A1* | 2/2010 | Jeon | H04L 67/1034 709/226 |
| 2011/0082931 | A1* | 4/2011 | Wang | H04L 67/1023 709/224 |
| 2013/0031559 | A1* | 1/2013 | Alicherry | G06F 9/5077 718/104 |
| 2013/0297596 | A1 | 11/2013 | Mouline et al. | |
| 2015/0358401 | A1* | 12/2015 | Flavel | H04L 67/1008 370/235 |
| 2016/0087931 | A1* | 3/2016 | Kim | H04L 61/1511 709/203 |
| 2016/0212204 | A1 | 7/2016 | Huang et al. | |
| 2017/0090787 | A1* | 3/2017 | Hanif | G06F 3/0619 |
| 2017/0192825 | A1* | 7/2017 | Biberman | H04L 67/1008 |
| 2018/0278570 | A1* | 9/2018 | Dhanabalan | H04L 61/1552 |

FOREIGN PATENT DOCUMENTS

| | | |
|---|---|---|
| CN | 101815104 A | 8/2010 |
| CN | 101834910 A | 9/2010 |
| CN | 104158919 A | 11/2014 |
| CN | 105847462 A | 8/2016 |
| CN | 105939399 A | 9/2016 |
| CN | 108011994 A | 5/2018 |
| CN | 108881506 A | 11/2018 |
| EP | 0817444 A2 | 1/1998 |
| EP | 2579539 A1 | 4/2013 |

* cited by examiner

DOMAIN NAME RESOLUTION METHOD AND APPARATUS BASED ON A PLURALITY OF AVAILABILITY ZONES AZ

CROSS-REFERENCE TO RELATED APPLICATIONS

This application is a continuation of International Application No. PCT/CN2019/083614, filed on Apr. 22, 2019, which claims priority to Chinese Patent Application No. 201810565417.0, filed on Jun. 4, 2018. The disclosures of the aforementioned applications are hereby incorporated by reference in their entireties.

TECHNICAL FIELD

The present disclosure relates to the field of computer technologies, and in particular, to a domain name resolution method and apparatus based on a plurality of availability zones.

BACKGROUND

With arrival of an internet era, cloud computing services are used in various industries. To ensure service reliability, a plurality of availability zones (AZ) are generally used to provide cloud computing services. As shown in FIG. 1, a storage service is used as an example of the cloud computing service, and a storage system configured to provide the storage service may store one piece of data in a plurality of AZs. For example, data 1 may be stored in an AZ 1 and an AZ 3. In this way, when one of the AZs that store the data is faulty, the data may also be obtained from another AZ.

FIG. 2 is a flowchart of a method for providing a service for a client by using the storage system shown in FIG. 1. First, the client stores a correspondence between a to-be-accessed domain name and an internet protocol (IP) address of an AZ. For example, a domain name 1 corresponds to an IP address of an AZ 1, namely, an IP address 1; a domain name 2 corresponds to an IP address of an AZ 2, namely, an IP address 2; and a domain name 3 corresponds to an IP address of an AZ 3, namely, an IP address 3. When the client needs to access the domain name 1, the client sends an access request to an AZ whose IP address is the IP address 1. To ensure service availability, if a to-be-accessed AZ is faulty, two AZ switching modes may be used to continue to provide the service for the client. A first mode is to manually switch, by operation and maintenance personnel, an AZ address accessed by the client to implement switching. For example, the operation and maintenance personnel need to first determine a faulty AZ, and then manually configure a new AZ address for the client. For example, a correspondence between the domain name 1 and the IP address 1 is replaced with a correspondence between the domain name 1 and the IP address 3. A second mode is to make repeated attempts many times, by using the client, to finally select a non-faulty AZ for access. For example, the client records an address of each AZ in the storage system. When the client determines that the AZ whose IP address is the IP address 1 cannot be accessed, the client can only sequentially select a next AZ for access until an AZ that can be accessed is found, to implement AZ switching.

It can be learned that in the prior art, a process from occurrence of a fault to selection of a new AZ through AZ switching results in a comparatively high delay. Consequently, this results in long-time service interruption and reduces service continuity.

SUMMARY

Embodiments of the present disclosure provide a domain name resolution method and apparatus based on a plurality of availability zones (AZ), to increase service continuity.

According to a first aspect, an embodiment of the present disclosure provides a domain name resolution method based on a plurality of availability zones AZ. In the method, after receiving, from a client, a domain name resolution request including a domain name of a to-be-accessed resource, a domain name system (DNS) determines, from a plurality of AZs corresponding to the domain name, a first AZ in a service available state, where each of the plurality of AZs provides the to-be-accessed resource, and then sends an internet protocol (IP) address of the first AZ to the client.

In the foregoing technical solution, the DNS processes the domain name resolution request sent by the client. After receiving the domain name resolution request sent by the client, the DNS feeds back, to the client, an IP address that is of an AZ in the service available state and that corresponds to the domain name resolution request. In this way, the client is not aware of a fault of an AZ, certainly there is no need for operation and maintenance personnel to manually switch the AZ, and the client does not need to make repeated attempts to find a usable AZ. This can reduce a delay caused by the fault of the AZ and increase service continuity.

In a possible design, the DNS first determines a status of each of the plurality of AZs, where the status includes the service available state or a service unavailable state. Then, the DNS determines the first AZ from the plurality of AZs based on the status of each of the plurality of AZs.

In the foregoing technical solution, the DNS may determine the first AZ based on the status of each of the plurality of AZs corresponding to the domain name. A processing manner is simple, and power consumption of the DNS can be reduced.

In a possible design, the DNS first obtains a heartbeat and/or a load of each of the plurality of AZs, and determines the status of each of the plurality of AZs based on the heartbeat and/or the load of each of the plurality of AZs. For example, if the DNS determines that a heartbeat of a second AZ is not received within a preset duration and/or a load of the second AZ exceeds a preset load, the DNS determines that the second AZ is in the service unavailable state, where the second AZ is one of the plurality of AZs.

In the foregoing technical solution, the DNS uses a manner of determining the status of each AZ by monitoring the heartbeat and/or the load of each of the plurality of AZs in real time. This can ensure accuracy of obtaining the status of each AZ. In addition, a processing manner is simple and easy to implement.

In a possible design, the DNS may determine, from the plurality of AZs, one of a plurality of AZs in the service available state as the first AZ.

In the foregoing technical solution, the DNS first screens, from the plurality of AZs, the plurality of AZs in the service available state to narrow a selection range, and then selects one AZ from the screened plurality of AZs as the first AZ. This can reduce an operation amount of the DNS and reduce power consumption of the DNS.

In a possible design, the DNS determines, based on at least one factor of distances between the client and the plurality of AZs in the service available state, a priority of the client, and loads of the plurality of AZs in the service available state, the first AZ from the plurality of AZs in the service available state.

In the foregoing technical solution, the DNS may select, based on a use status, the at least one factor, and determine, from the plurality of AZs, one AZ that best meets the use status as the first AZ. This can increase reliability and availability of a storage system, and improve access performance of the storage system.

In a possible design, a manner in which the DNS determines the first AZ based on the distances between the client and the plurality of AZs in the service available state may include: first obtaining, by the DNS, an IP address of the client; and then calculating, based on the IP address of the client and IP addresses of the plurality of AZs in the service available state, a distance between the client and each of the plurality of AZs in the service available state, and determining an AZ closest to the client as the first AZ.

In the foregoing technical solution, the DNS may select the AZ closest to the client and feed back the AZ to the client for use. This can reduce a distance between the client and the AZ, and further reduce a data transmission delay and further improve access performance.

In a possible design, a manner in which the DNS determines the first AZ based on the priority of the client may include: selecting, by the DNS based on the priority of the client and performance of the plurality of AZs in the service available state from the plurality of AZs in the service available state, an AZ that matches the priority of the client as the first AZ.

In the foregoing technical solution, the DNS may allocate AZs with different performance to clients based on different priority levels of the clients. For example, an AZ with good performance is preferentially allocated to a client with a higher priority level for access. This can improve a storage system hierarchical capability and client performance. Further, because the DNS sets different priority levels for the clients, a plurality of clients may be allocated to different AZs by dividing the priority levels for access. This can reduce a probability of breakdown caused by an excessively large access volume of an AZ, and increase stability of the storage system.

In a possible design, a manner in which the DNS determines the first AZ based on the loads of the plurality of AZs in the service available state may include: first determining, by the DNS, a load of each of the plurality of AZs in the service available state; and then determining, from the plurality of AZs in the service available state, an AZ whose load is less than a threshold as the first AZ.

In the foregoing technical solution, the DNS may reasonably regulate an access amount of each AZ based on the load of each AZ in the storage system. This can reduce a probability of breakdown caused by an excessively large access volume of an AZ, and increase stability of the storage system.

In a possible design, a manner in which the DNS determines the first AZ based on the loads of the plurality of AZs in the service available state may include: first determining, by the DNS, a load of each of the plurality of AZs in the service available state; and then selecting, from the plurality of AZs in the service available state, an AZ with a minimum load as the first AZ.

In the foregoing technical solution, the DNS may allocate, based on the load of each AZ in the storage system, the AZ with a minimum load to the client for access. This can reduce a delay of processing an access request of the client by the storage system, and improve access performance of the storage system.

According to a second aspect, an embodiment of the present disclosure provides a domain name resolution apparatus based on a plurality of availability zones (AZ). The apparatus includes a processor, configured to implement the method according to the first aspect. The apparatus may further include a memory, configured to store a program instruction and data. The memory is coupled to the processor. The processor may invoke and execute the program instruction stored in the memory, to implement the method according to the first aspect. The apparatus may further include a communications interface, and the communications interface is configured by the apparatus to communicate with another device. For example, the another device is a client.

In a possible design, the apparatus includes:

the communications interface, configured to receive a domain name resolution request from the client under control of the processor, where the domain name resolution request includes a domain name of a to-be-accessed resource, the domain name corresponds to a plurality of AZs, and each of the plurality of AZs is capable of providing the to-be-accessed resource; and the processor, configured to determine, from the plurality of AZs, a first AZ in a service available state; where the communications interface is further configured to send an internet protocol (IP) address of the first AZ to the client under the control of the processor.

In a possible design, the processor is specifically configured to: determine a status of each of the plurality of AZs, where the status includes the service available state or a service unavailable state; and determine the first AZ from the plurality of AZs based on the status of each AZ.

In a possible design, the processor is specifically configured to: obtain a heartbeat and/or a load of each of the plurality of AZs; and if the processor determines, based on the heartbeat and/or the load of each AZ, that a heartbeat of a second AZ is not received within a preset duration and/or a load of the second AZ exceeds a preset load, determine, by the processor, that the second AZ is in the service unavailable state, where the second AZ is one of the plurality of AZs.

In a possible design, the processor is specifically configured to determine one of a plurality of AZs in the service available state as the first AZ, where the plurality of AZs in the service available state belong to the plurality of AZs.

In a possible design, the processor is specifically configured to determine, based on at least one factor of distances between the client and the plurality of AZs in the service available state, a priority of the client, and loads of the plurality of AZs in the service available state, the first AZ from the plurality of AZs in the service available state.

In a possible design, the processor is specifically configured to: obtain an IP address of the client; and calculate, based on the IP address of the client and IP addresses of the plurality of AZs in the service available state, a distance between the client and each of the plurality of AZs in the service available state, and determine an AZ closest to the client as the first AZ.

In a possible design, the processor is specifically configured to select, based on the priority of the client and performance of the plurality of AZs in the service available state from the plurality of AZs in the service available state, an AZ that matches the priority of the client as the first AZ.

In a possible design, the processor is specifically configured to: determine a load of each of the plurality of AZs in the service available state; and determine an AZ whose load is less than a threshold as the first AZ.

In a possible design, the processor is specifically configured to: determine a load of each of the plurality of AZs in the service available state; and select, from the plurality of AZs in the service available state, an AZ with a minimum load as the first AZ.

According to a third aspect, an embodiment of the present disclosure provides a domain name resolution apparatus based on a plurality of availability zones (AZ). The apparatus may be a domain name system (DNS), or may be an apparatus in a DNS. The apparatus may include an obtaining unit, a processing unit, and a sending unit, and these modules may perform corresponding functions in any design example in the first aspect.

The obtaining unit is configured to receive a domain name resolution request from a client, where the domain name resolution request includes a domain name of a to-be-accessed resource, the domain name corresponds to a plurality of AZs, and each of the plurality of AZs is capable of providing the to-be-accessed resource.

The processing unit is configured to determine, from the plurality of AZs, a first AZ in a service available state.

The sending unit is configured to send an internet protocol (IP) address of the first AZ to the client.

In a possible design, the processing unit is specifically configured to: determine a status of each of the plurality of AZs, where the status includes the service available state or a service unavailable state; and determine the first AZ from the plurality of AZs based on the status of each AZ.

In a possible design, the obtaining unit is specifically configured to obtain a heartbeat and/or a load of each of the plurality of AZs; and the processing unit is specifically configured to: if the processing unit determines, based on the heartbeat and/or the load of each AZ, that a heartbeat of a second AZ is not received within a preset duration and/or a load of the second AZ exceeds a preset load, determine, by the processing unit, that the second AZ is in the service unavailable state, where the second AZ is one of the plurality of AZs.

In a possible design, the processing unit is specifically configured to determine one of a plurality of AZs in the service available state as the first AZ, where the plurality of AZs in the service available state belong to the plurality of AZs.

In a possible design, the processing unit is specifically configured to determine, based on at least one factor of distances between the client and the plurality of AZs in the service available state, a priority of the client, and loads of the plurality of AZs in the service available state, the first AZ from the plurality of AZs in the service available state.

In a possible design, the obtaining unit is specifically configured to obtain an IP address of the client; and the processing unit is specifically configured to: calculate, based on the IP address of the client and IP addresses of the plurality of AZs in the service available state, a distance between the client and each of the plurality of AZs in the service available state, and determine an AZ closest to the client as the first AZ.

In a possible design, the processing unit is specifically configured to select, based on the priority of the client and performance of the plurality of AZs in the service available state from the plurality of AZs in the service available state, an AZ that matches the priority of the client as the first AZ.

In a possible design, the processing unit is specifically configured to: determine a load of each of the plurality of AZs in the service available state; and determine an AZ whose load is less than a threshold as the first AZ.

In a possible design, the processing unit is specifically configured to: determine a load of each of the plurality of AZs in the service available state; and select, from the plurality of AZs in the service available state, an AZ with a minimum load as the first AZ.

According to a fourth aspect, an embodiment of the present disclosure provides a computer-readable storage medium. The computer-readable storage medium stores a computer program, the computer program includes a program instruction, and when the program instruction is executed by a computer, the computer is enabled to perform the method according to the first aspect.

According to a fifth aspect, an embodiment of the present disclosure provides a computer program product. The computer program product stores a computer program, the computer program includes a program instruction, and when the program instruction is executed by a computer, the computer is enabled to perform the method according to the first aspect.

According to a sixth aspect, the present disclosure provides a chip system. The chip system includes a processor, and may further include a memory, to implement the method according to the first aspect. The chip system may include a chip, or may include a chip and another discrete component.

For beneficial effects of the second aspect to the sixth aspect and the implementations of the second aspect to the sixth aspect, refer to the descriptions of the beneficial effects of the method in the first aspect and the implementations of the first aspect.

DESCRIPTION OF EMBODIMENTS

To make objectives, technical solutions, and advantages of embodiments of the present disclosure clearer, the following describes the technical solutions in the embodiments of the present disclosure in detail with reference to accompanying drawings in this specification and specific implementations.

Figure 3A:
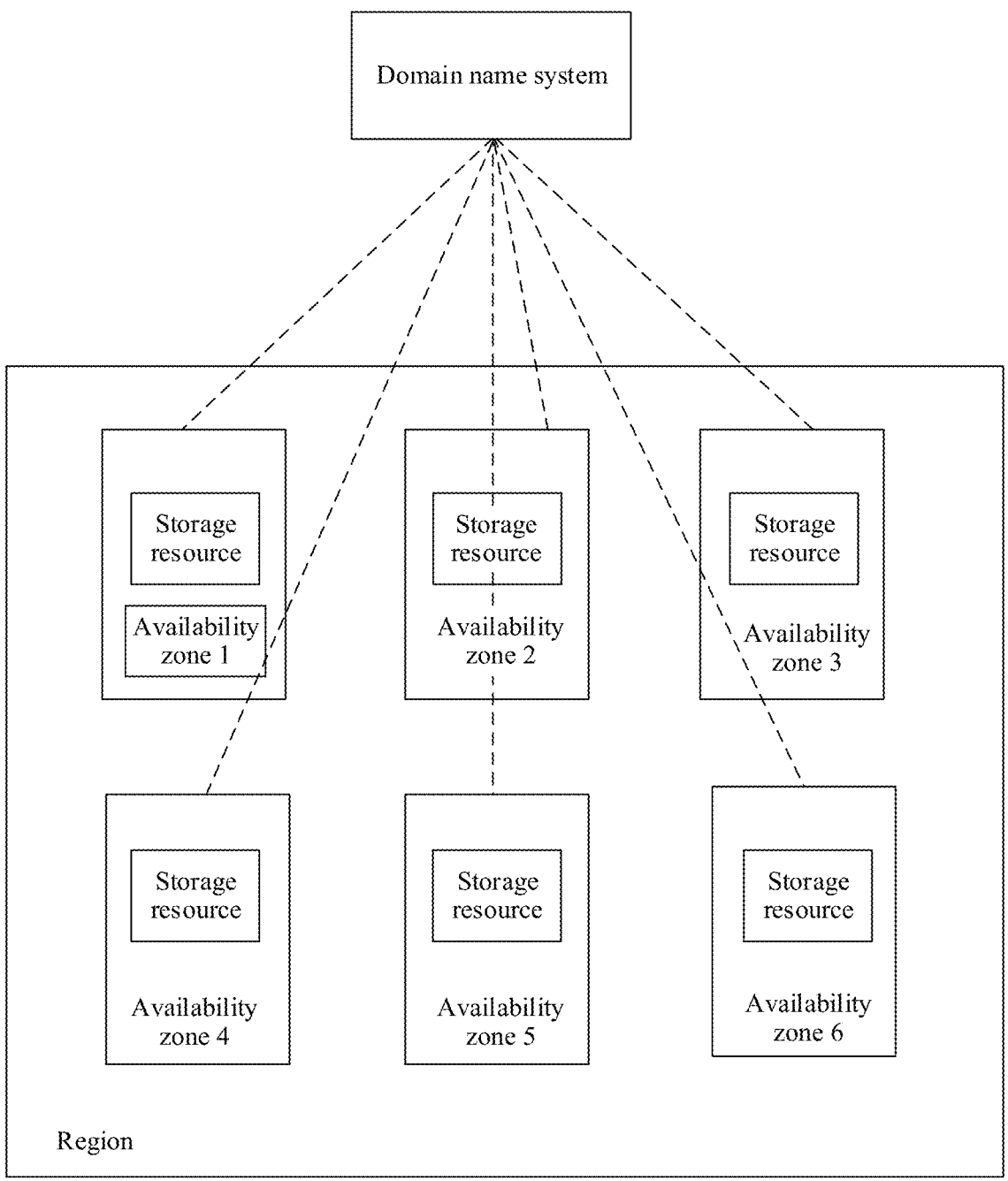
FIG. 3A is an architectural diagram of a storage system with a plurality of AZs according to an embodiment of the present disclosure.
Figure 3B:
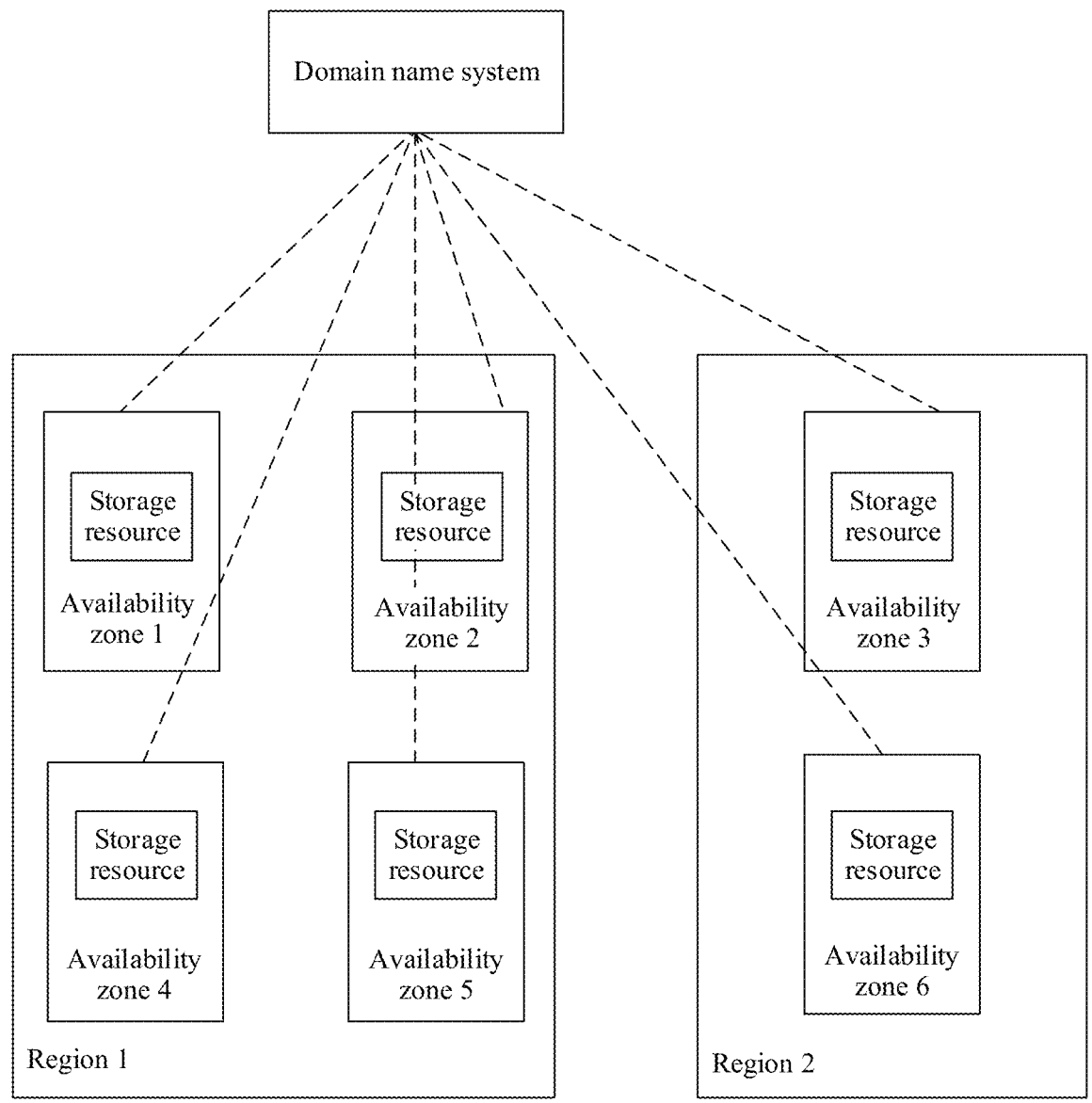
FIG. 3B is another architectural diagram of a storage system with a plurality of AZs according to an embodiment of the present disclosure.
Figure 3C:
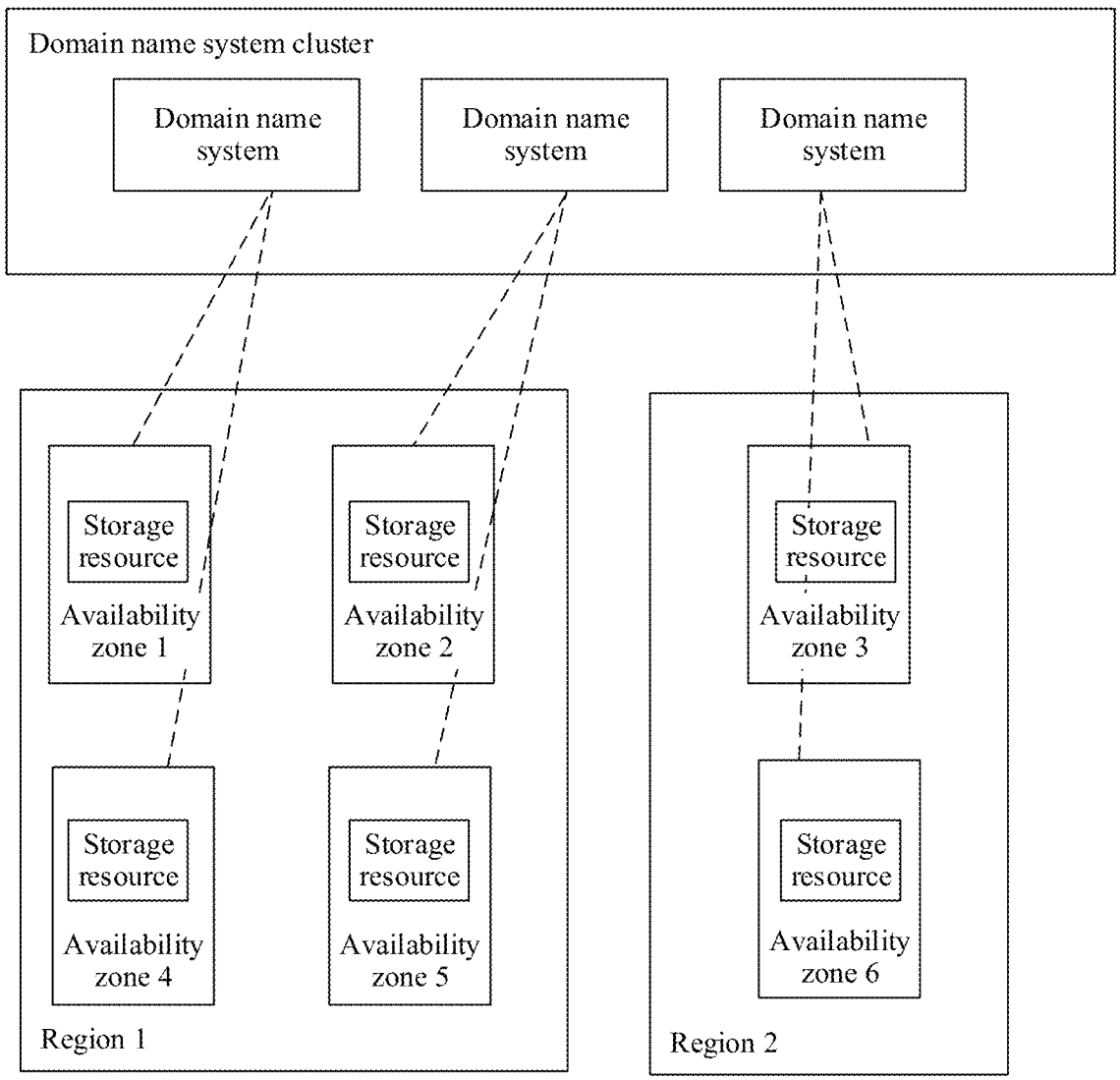
FIG. 3C is still another architectural diagram of a storage system with a plurality of AZs according to an embodiment of the present disclosure.

An embodiment of the present disclosure provides a domain name resolution method based on a plurality of availability zones (AZ). The method is applied to cloud computing services in a plurality of AZs. Each AZ can provide a corresponding cloud computing service for a client, to be specific, provide a corresponding resource for the client. The client can access the resource in the AZ. The AZ generally includes one or more data centers. The AZ is mainly used to increase high availability of the resource. The resource provided by the cloud computing service for the client may be a storage resource, for example, a storage system. The storage system may be a file storage system, a block storage system, an object storage system, or a combination of the storage systems. Alternatively, the resource provided by the cloud computing service for the client may be a computing resource. For example, the cloud computing service may be a virtual machine. This is not limited in this embodiment of the present disclosure. When the client accesses the resource in the AZ, the client sends a domain name resolution request to a domain name system (DNS), where the domain name resolution request includes a domain name of a to-be-accessed resource. The DNS determines, from the plurality of AZs, an IP address of one AZ in a service available state. The IP address of the AZ may be a physical IP address or a virtual IP address. In this embodiment of the present disclosure, the storage system is used as an example. FIG. 3A to FIG. 3C are architectural diagrams of three possible storage systems according to embodiments of the present disclosure. The following describes the three possible storage systems.

Figure 1:
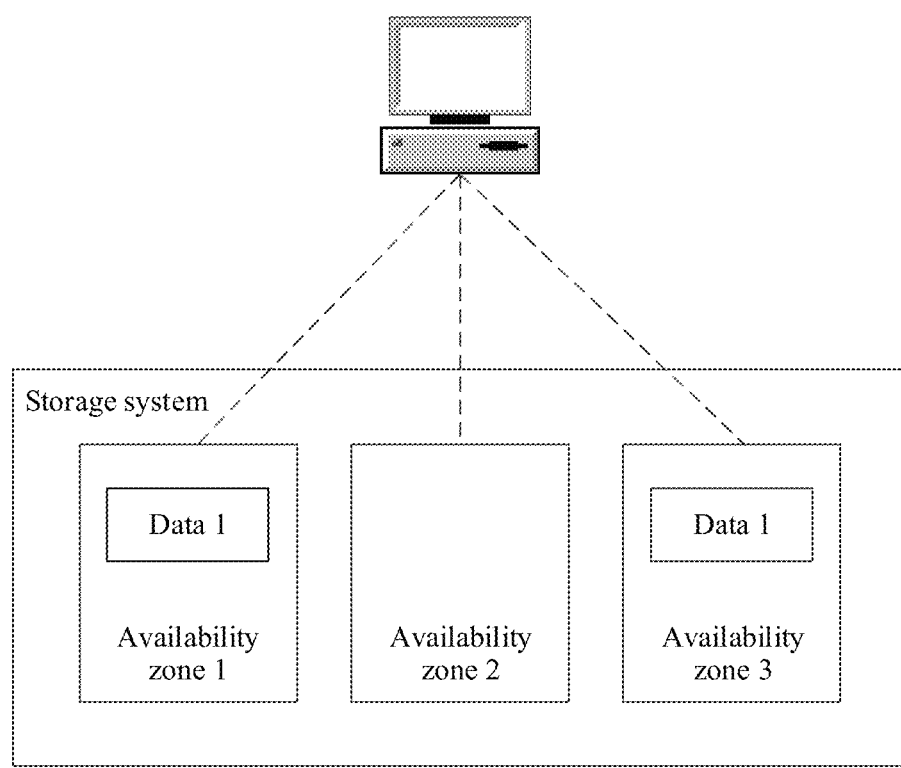
FIG. 1 is an architectural diagram of a storage system with a plurality of AZs in the prior art.
Figure 2:
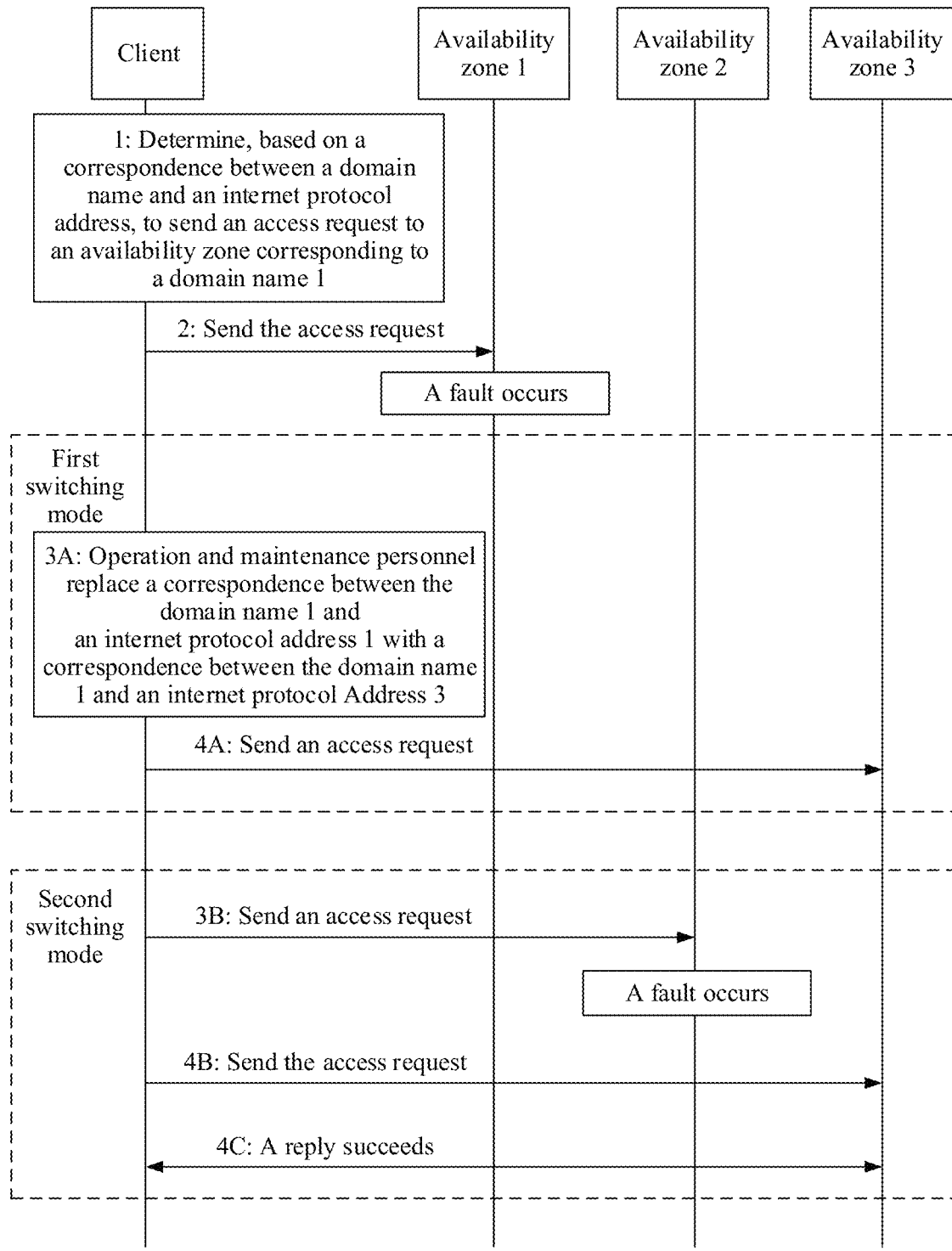
FIG. 2 is a flowchart of providing a service for a client by using the storage system shown in FIG. 1.

Different from a storage system shown in FIG. 1, each of the storage systems shown in FIG. 3A to FIG. 3C in the embodiments of the present disclosure has a corresponding DNS. The DNS may be configured to manage a plurality of AZs, for example, an AZ 1 to an AZ 6. Each AZ is independent of another AZ, to be specific, each AZ has independent power supply, an independent network, and the like. In this way, when an AZ is faulty, normal use of other AZs is not affected. The plurality of AZs may be located in a same region. As shown in FIG. 3A, the plurality of AZs in the same region may be connected by using a high-speed network, to ensure a comparatively low delay. The plurality of AZs may alternatively be located in different regions. As shown in FIG. 3B, regions are also independent of each other, and the plurality of regions may be connected by using a wireless network. Each AZ corresponds to one IP address.

Different from system architectures shown in FIG. 3A and FIG. 3B, a system architecture shown in FIG. 3C includes a plurality of DNSs, and the plurality of DNSs are deployed through clustering to form a cluster system. In this way, when a DNS in the cluster system is faulty, the cluster system can still provide a service for a client by using another DNS.

It should be noted that a storage system with a plurality of AZs is not limited to the architectures shown in FIG. 3A to FIG. 3C. The storage systems described in the embodiments of the present disclosure are intended to describe the technical solutions in the embodiments of the present disclosure more clearly, and do not constitute limitations on the technical solutions provided in the embodiments of the present disclosure. A person of ordinary skill in the art may learn that, with evolution of a storage technology and a storage system architecture, the technical solutions provided in the embodiments of the present disclosure are also applicable to similar technical problems.

The following describes terms related to the storage system, to facilitate understanding by a person skilled in the art.

(1) The DNS may be a DNS server, for example, a secure DNS (SDNS) server, or may be a server device installed with DNS software, for example, a computer, a relay station, or an access point. The server device installed with the DNS software may be software based on a Linux-like operating system, for example, open source BIND software. The DNS may alternatively be software based on a Windows operating system, for example, NtBind software. The DNS may alternatively be a logical concept, for example, a software module or a function corresponding to a service provided by the DNS, and may be understood as a virtualization function implemented through virtualization, for example, a virtual machine specially used for domain name resolution. This is not specifically limited in the embodiments of the present disclosure.

(2) The domain name is a name of a resource in an AZ in the storage system, and is used to identify an electronic bearing or a geographical location of the resource during data transmission. The domain name includes a string of characters separated by dots. For example, www.wikipedia.org is a domain name, and each domain name corresponds to an IP address. One domain name may correspond to a plurality of IP addresses, or may correspond to only one IP address. Compared with an IP address used as a digital identifier for routing and addressing, the domain name may be understood as a character identifier. For example, the domain name www.wikipedia.org corresponds to an IP address 208.80.152.2. After the client invokes the domain name www.wikipedia.org, the DNS converts the domain name into the IP address 208.80.152.2 that is easy for a machine to identify.

(3) A heartbeat is a detection technology in which customized information such as a heartbeat packet or a heartbeat frame is sent at a specific time interval, so that a receiver knows that a sender is "online", to ensure connection validity. The heartbeat sender may be a DNS. For example, the DNS may send the heartbeat packet to each client in a scheduled polling manner. The heartbeat sender may alternatively be a client. For example, the client sends a heartbeat packet to the DNS at fixed duration. Specific content of the heartbeat packet may be content agreed upon by the DNS and the client, or may be an empty packet including only a packet header. This is not limited herein.

(4) The service available state is a state in which a read operation, a write operation, or another operation can be performed. A specific operation is related to a configuration of the resource in each AZ. For example, a resource in the AZ 1 is configured to process a read operation of the client. When the resource can provide a read operation service for the client, it is considered that the AZ 1 is in the service available state. Alternatively, a resource in an AZ 2 is configured to process read and write operations of the client. When the resource can provide a read operation service and a write operation service for the client, it is considered that the AZ 2 is in the service available state.

(5) The client may be a server configured for a function, for example, a server configured to store data. The client may be a device installed with client software. The device may be a computer, a mobile terminal, or the like, or may be a logical concept, for example, a software module or a virtual machine implemented through virtualization. This is not specifically limited in the embodiments of the present disclosure.

In addition, the term "and/or" in this specification describes only an association relationship for describing associated objects and represents that three relationships may exist. For example, A and/or B may represent the following three cases: Only A exists, both A and B exist, and only B exists. In addition, unless otherwise specified, the character "/" in this specification generally indicates an "or" relationship between the associated objects.

An embodiment of the present disclosure provides a domain name resolution method based on a plurality of AZs. The method is applied to the storage systems shown in FIG. 3A to FIG. 3C. The following uses an example in which the technical solutions provided in the embodiments of the present disclosure are applied to the storage system shown in FIG. 3A.

Figure 4:
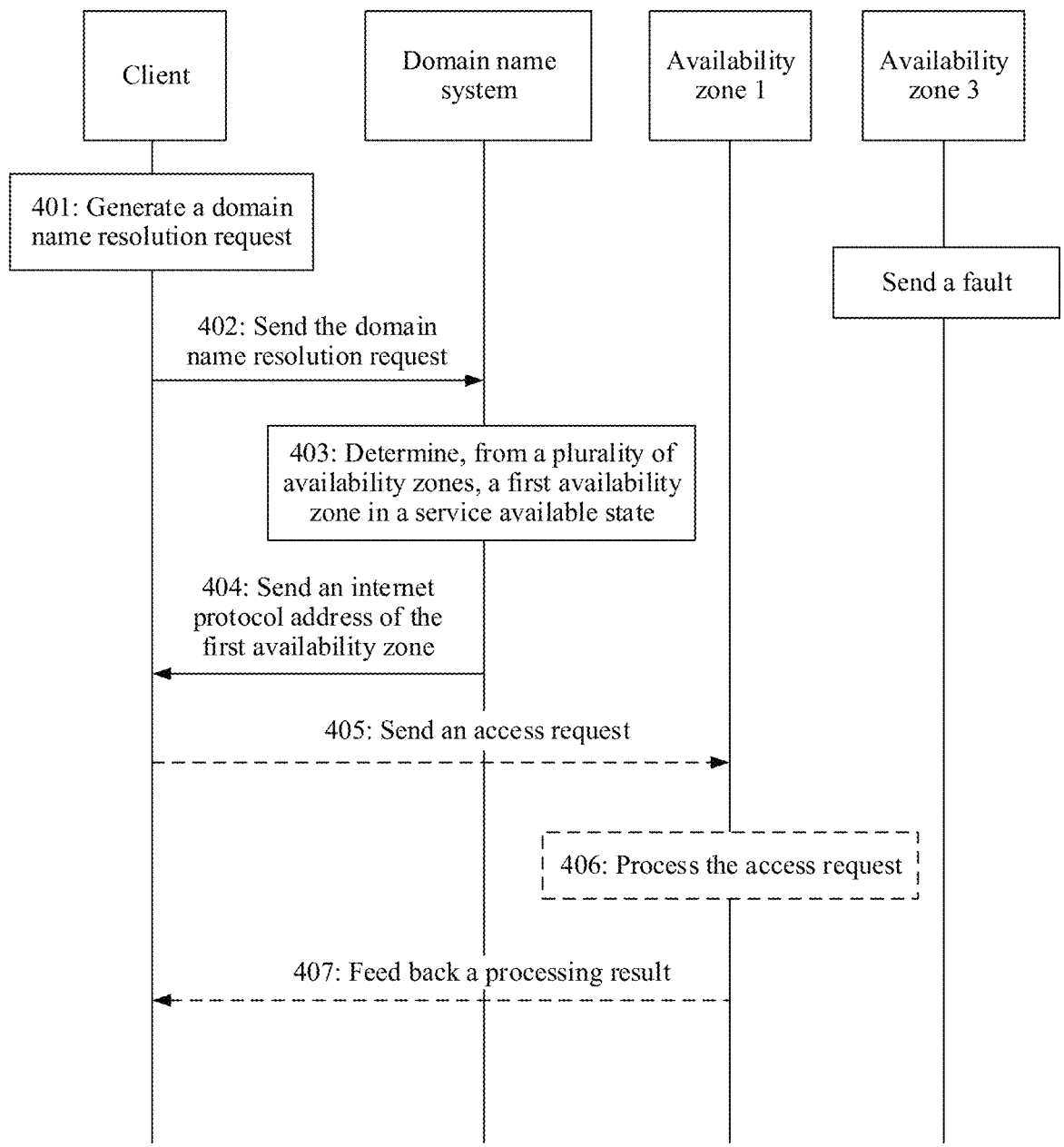
FIG. 4 is a flowchart of a domain name resolution method based on a plurality of availability zones AZ according to an embodiment of the present disclosure.

FIG. 4 is a flowchart of a domain name resolution method based on a plurality of availability zones (AZs), according to an embodiment of the present disclosure. The flowchart includes the following steps.

Step 401: A client generates a domain name resolution request.

In this embodiment of the present disclosure, the domain name resolution request includes a domain name of a to-be-accessed resource. In the following description, an example in which the resource is a storage resource is used. It should be noted that there may be a plurality of clients interacting with a DNS. In this embodiment of the present disclosure, an example in which the client is one of the clients interacting with the DNS is used.

In an example, the client stores domain names of storage systems that provide different services. For example, the client stores three domain names: a domain name 1, a domain name 2, and a domain name 3. The domain name 1 is a domain name of a storage system configured to store image data, the domain name 2 is a domain name of a storage system configured to store voice data, and the domain name 3 is a domain name of a storage system configured to store video data. The domain name may be configured by the DNS, or may be agreed upon by the client and the DNS. When the client determines, based on an operation performed by a user, to access a storage system, for example, to read or store the video data, the client generates a domain name resolution request for resolving a domain name of the storage system, for example, generates a domain name resolution request for resolving the domain name 3.

It should be noted that, in this embodiment of the present disclosure, the client does not need to store information about an AZ again, for example, a correspondence between a domain name and an IP address of the AZ. This can reduce memory usage of the client and reduce a perception capability of the client for the AZ.

Step 402: The client sends the domain name resolution request to the DNS, and the DNS receives the domain name resolution request.

In this embodiment of the present disclosure, after generating the domain name resolution request, the client sends the domain name resolution request to the DNS, and the DNS resolves an address of the storage system corresponding to the domain name. In this way, the client can omit a process of performing route selection on the plurality of AZs. This can reduce operation complexity of the client. Further, there is no need to develop a function of performing route selection on the plurality of AZs for each client. This can reduce waste of a human resource.

Step 403: The DNS determines, from the plurality of AZs, a first AZ in a service available state.

In this embodiment of the present disclosure, one domain name corresponds to a plurality of AZs, and each of the plurality of AZs provides a storage resource to be accessed by the client. To ensure data reliability, same data is stored in the plurality of AZs. For example, in the storage system shown in FIG. 3A, video data of the client may be separately stored in an AZ 1, an AZ 2, and an AZ 3. Therefore, the domain name 3 for storing the video data corresponds to the AZ 1 to the AZ 3. The first AZ is an AZ that is determined by the DNS, that is fed back to the client, and that corresponds to the domain name.

It should be noted that a correspondence between a domain name and an AZ(s) may be fixed. For example, the DNS pre-configures an AZ corresponding to different types of data of the client. For example, the video data of the client is fixedly stored in the AZ 1 to the AZ 3, voice data of the client is fixedly stored in an AZ 4 and an AZ 5. Image data of the client is fixedly stored in an AZ 6. Therefore, a fixed correspondence is formed between the domain name 1 and the AZ 6, a fixed correspondence is formed between the domain name 2 and the AZ 4 and the AZ 5, and a fixed correspondence is formed between the domain name 3 and the AZ 1 to the AZ 3. Alternatively, a correspondence between a domain name and an AZ/(s) may dynamically change. For example, the DNS stores the different types of data of the client based on loads in the AZs. For example, the DNS determines, at a first moment, to store the video data of the client in the AZ 1, the AZ 2, and the AZ 4. In this case, a correspondence is formed between the domain name 3 and the AZ 1, the AZ 2, and the AZ 4. As the load in each AZ increases, the DNS determines that a load in the AZ 4 has reached an upper limit, and the DNS may migrate the video data of the client stored in the AZ 4 to the AZ 3. Therefore, a correspondence between the domain name 3 and AZs changes from the correspondence between the domain name 3 and the AZ 1, the AZ 2, and the AZ 4 to a correspondence between the domain name 3 and the AZ 1 to the AZ 3. Certainly, a correspondence between a domain name and an AZ(s) may alternatively be another case. This is not limited herein.

1e;.4qAfter the DNS receives, from the client, the domain name resolution request for resolving the domain name, the DNS determines, based on the correspondence between a domain name and an AZ(s), the first AZ from a plurality of AZs corresponding to the domain name. In this embodiment of the present disclosure, the correspondence between a domain name and an AZ/(s) may be a correspondence between the domain name and an index number the AZ or index numbers of the AZs. The index number of the AZ may be a number that is of each AZ and that is numbered by the DNS. As shown in Table 1, each domain name corresponds to at least one AZ number. Alternatively, the correspondence between a domain name and an AZ(s) may be a correspondence including the domain name and an IP address of the AZ or IP addresses of the AZs. For example, IP addresses of the AZ 1 to the AZ 6 are an IP address 1 to an IP address 6. As shown in Table 2, each domain name corresponds to at least one IP address. Alternatively, the correspondence between a domain name and an AZ(s) may be a correspondence including the domain name, a number of the AZ or numbers of the AZs, and an IP address of the AZ or IP addresses of the AZs, as shown in Table 3. Details are not described herein. In a specific implementation process, the correspondence between a domain name and an AZ(s) includes but is not limited to the three cases shown in Table 1 to Table 3, and the correspondence between a domain name and an AZ(s) is not limited in this embodiment of the present disclosure.

TABLE 1

| Domain names | Numbers of the AZs |
|---|---|
| Domain name 1 | AZ 6 |
| Domain name 2 | AZ 4 and AZ 5 |
| Domain name 3 | AZ 1, AZ 2, and AZ 3 |

TABLE 2

| Domain names | IP addresses of the AZs |
| --- | --- |
| Domain name 1 | IP address 6 |
| Domain name 2 | IP address 4 and IP 5 |
| Domain name 3 | IP address 1, IP address 2, and IP address 3 |

TABLE 3

| Domain names | Numbers of the AZs | IP addresses of the AZs |
| --- | --- | --- |
| Domain name 1 | AZ 6 | IP address 6 |
| Domain name 2 | AZ 4 and AZ 5 | IP address 4 and IP address 5 |
| Domain name 3 | AZ 1, AZ 2, and AZ 3 | IP address 1, IP address 2, and IP address 3 |

It should be noted that, in this embodiment of the present disclosure, the first AZ is determined by the DNS from the plurality of AZs corresponding to the domain name after the DNS receives the domain name resolution request, and is a general term rather than a special AZ.

In this embodiment of the present disclosure, manners in which the DNS determines the first AZ from the plurality of AZs corresponding to the domain name include but are not limited to the following five manners. The following separately describes the five manners.

First Manner:

The DNS first determines, based on the correspondence between a domain name and an AZ(s), that AZs corresponding to the domain name 3 are the AZ 1, the AZ 2, and the AZ 3. Then, the DNS obtains a status of one AZ from the AZ 1 to the AZ 3, where the status includes the service available state or a service unavailable state. For example, the DNS first obtains a status of the AZ 1 based on numbers of the AZs. If the status of the AZ 1 is the service available state, the DNS determines that the AZ 1 is the first AZ. If the status of the AZ 1 is the service unavailable state, the DNS sequentially obtains a status of the AZ 2 until an AZ in the service available state is found from the AZ 1 to the AZ 3, and uses the AZ in the service available state as the first AZ. Certainly, the DNS may alternatively obtain statuses of the AZ 1 to the AZ 3 simultaneously, and use an AZ that is ranked first and that is determined as the service available state as the first AZ.

In an example, the DNS may obtain the status of each AZ through a Checker.checkStatus interface used to query a status of the storage system. For example, the DNS may send status query information to the AZ 1 through the Checker.checkStatus interface. If the AZ 1 is not faulty, after receiving the status query information, the AZ 1 sends, to the DNS, feedback information corresponding to the status query information. If the AZ 1 is faulty, the AZ 1 cannot send the feedback information to the DNS. Therefore, when the DNS receives the feedback information of the AZ 1 within preset duration, for example, 2 ms or 3 ms, the DNS determines that the status of the AZ 1 is the service available state. If the DNS does not receive the feedback information of the AZ 1 within the preset duration, the DNS determines that the status of the AZ 1 is the service unavailable state. By analogy, the status of each of the AZ 1 to the AZ 3 is determined.

It should be noted that the status query information and the feedback information may be pre-agreed upon by the DNS and each AZ, or may be configured by the DNS. This is not limited herein.

In another example, each AZ may alternatively send a heartbeat to the DNS through a Checker.checkStatus interface of the DNS. For example, the DNS may set, through a Config.setDataCenterInfo interface used to set information about a storage system, each AZ to send the heartbeat to the DNS according to a preset period, where the preset period may be 2 s.

If the DNS receives a heartbeat of the AZ 1 within the preset period, the DNS determines that the AZ 1 is in the service available state. If the DNS does not receive the heartbeat of the AZ 1 within the preset period, the DNS determines that the AZ 1 is in the service unavailable state. By analogy, the status of each of the AZ 1 to the AZ 3 is determined.

Second Manner:

The DNS first determines, based on the correspondence between a domain name and an AZ(s), that AZs corresponding to the domain name 3 are the AZ 1, the AZ 2, and the AZ 3. Then, the DNS determines a status of each of a plurality of AZs (namely, the AZ 1 to the AZ 3) corresponding to the domain name 3. Finally, the DNS determines the first AZ from the AZ 1 to the AZ 3 based on the status of each AZ.

In this manner, that the DNS determines the status of each of the plurality of AZs includes but is not limited to the following three cases.

In a first case, the DNS determines the status of each AZ based on a heartbeat of the AZ.

In an example, the DNS may use a manner of setting each AZ to send the heartbeat to the DNS through a Checker.checkStatus interface of the DNS, to obtain the status of each of the AZ 1 to the AZ 3. When the DNS does not receive a heartbeat of an AZ in the AZ 1 to the AZ 3 within preset duration, it is determined that a status of the AZ is the service unavailable state. The DNS may alternatively use a manner of sending status query information to each of the AZ 1 to the AZ 3 through a Checker.checkStatus interface of the DNS, to obtain the status of each of the AZ 1 to the AZ 3. This case is the same as corresponding content in the first manner, and details are not described herein.

It should be noted that when the DNS sets a period of sending the heartbeat to the DNS for each AZ, the DNS may set a same period of sending heartbeats to the DNS for all the AZs. For example, each AZ sends the heartbeat to the DNS at a period of 2 s. The DNS may alternatively set different periods of sending heartbeats for the AZs. For example, a period that is of sending a heartbeat and that is of the AZ 1 is set to 1 s, a period that is of sending a heartbeat and that is of the AZ 2 is set to 2 s, and a period that is of sending a heartbeat and that is of the AZ 3 is set to 3 s. This is not limited in this embodiment of the present disclosure. In addition, when the AZ sends the heartbeat to the DNS, identification information of the AZ, for example, the number of the AZ, needs to be carried, so that the DNS may distinguish, based on the identification information, the AZ that sends the heartbeat.

In a second case, the DNS determines the status of each AZ based on a load of the AZ.

In a first example, the DNS may obtain the load in each AZ through a Config.GetDataCenterInfo interface used to query information about the storage system. For example, the DNS may send load query information to the AZ 1 through the Config.GetDataCenterInfo interface. If the AZ 1 is not faulty, after receiving the load query information, the AZ 1 feeds back a load of the AZ 1 to the DNS. The load may be storage space usage, for example, may be 60% or 40%. The load may alternatively be a size of occupied storage space in the AZ, for example, may be 20 M or 30 M.

After receiving the load fed back by the AZ 1, the DNS determines a status of the AZ 1 based on a value relationship between the load of the AZ 1 and a preset load. Using an example in which the load is the storage space usage, the preset load may be 70% or 80%. If the load of the AZ 1 is greater than or equal to the preset load, it indicates that the load of the AZ 1 is already comparatively large. In this case, the AZ 1 cannot provide a write operation service for the client, and the DNS determines that the status of the AZ 1 is the service unavailable state. If the load of the AZ 1 is less than the preset load, it indicates that the AZ 1 has sufficient storage space to provide the write operation service for the client. In this case, the DNS determines that the status of the AZ 1 is the service available state. By analogy, the status of each of the AZ 1 to the AZ 3 is determined.

It should be noted that if the AZ 1 is faulty, the AZ 1 cannot send the load of the AZ 1 to the DNS. When the DNS does not receive the load fed back by the AZ 1 within preset duration, for example, 2 s, the DNS may directly determine the status of the AZ 1 is the service unavailable state.

In addition, it should be noted that forms of the load query information and the fed-back load may be pre-agreed upon by the DNS and each AZ, or may be configured by the DNS. This is not limited herein.

In a second example, each AZ may alternatively periodically feed back the load to the DNS through a Config.GetDataCenterInfo interface of the DNS. For example, the DNS may set, through a Config.setDataCenterInfo interface, each AZ to feed back the load to the DNS according to a preset period, where the preset period may be 2 s. In this case, the DNS determines the status of each AZ based on the load of the AZ. A manner in which the DNS determines the status based on the load is the same as that in the first example, and details are not described herein.

In the third case, the DNS determines the status of each AZ based on a heartbeat and a load of the AZ.

In this case, the DNS first needs to obtain the heartbeat and the load of each of the plurality of AZs. A specific manner of obtaining the heartbeat and the load of each AZ is the same as corresponding content in the first manner and second manner, and details are not described herein. Then, the DNS determines the status of each AZ jointly based on the heartbeat and the load of the AZ. For example, the DNS first determines whether a heartbeat of the AZ 1 is received within preset duration. If the heartbeat of the AZ 1 is received within the preset duration, the DNS determines whether the load of the AZ 1 is less than a preset load. If the load of the AZ 1 is less than the preset load, the DNS determines that the AZ 1 is in the service available state. If the DNS receives the heartbeat of the AZ 1 within the preset duration, but the load of the AZ 1 is greater than the preset load, the DNS determines that the AZ 1 is in the service unavailable state. If the DNS does not receive the heartbeat of the AZ 1 and the load of the AZ 1 within the preset duration, the DNS determines that the AZ 1 is in the service unavailable state. By analogy, the status of each of the AZ 1 to the AZ 3 is determined.

After determining the status of each of the AZ 1 to the AZ 3 in one of the foregoing manners, the DNS selects the AZ in the service available state as the first AZ. For example, only the AZ 2 in the AZ 1 to the AZ 3 is in the service available state, and therefore the DNS determines the AZ 2 as the first AZ.

Third Manner:

The DNS first determines, based on the correspondence between a domain name and an AZ(s), that AZs corresponding to the domain name 3 are the AZ 1, the AZ 2, and the AZ 3. Then, the DNS obtains a status of each of a plurality of AZs (namely, the AZ 1 to the AZ 3) corresponding to the domain name 3. In addition, at least one AZ in the service available state is determined from the AZ 1 to the AZ 3. Finally, the first AZ is determined from the at least one AZ in the service available state.

It should be noted that a method in which the DNS obtains the status of each of the plurality of AZs (namely, the AZ 1 to the AZ 3) corresponding to the domain name 3 is the same as a method in the first manner or the second manner, and details are not described herein. For example, the DNS determines that a status of the AZ 1 is the service available state, a status of the AZ 2 is the service available state, and a status of the AZ 3 is a service unavailable state. In this case, the DNS determines that AZs in the service available state from the plurality of AZs corresponding to the domain name 3 are the AZ 1 and the AZ 2, and then randomly selects one of the AZ 1 and the AZ 2 as the first AZ.

Fourth Manner:

The DNS periodically obtains statuses of all the AZs in the storage system, and stores the statuses in a memory of the DNS. The DNS may obtain the status of each AZ in one of the foregoing three manners. Details are not described herein. In an example, the status that is of the AZ and that is stored in the DNS may be separately stored. For example, in addition to storing the correspondence between a domain name and an AZ(s), the memory of the DNS further stores an AZ status list. In the status list, the status of each AZ is classified into the service available state or a service unavailable state. As shown in Table 4, in Table 4, the AZ 1 to the AZ 4 are in the service available state, and the AZ 5 and the AZ 6 are in the service unavailable state. Alternatively, the DNS may form an available AZ status list based on AZs in the service available state. When the statuses of the AZs are shown in Table 4, the available AZ status list includes the AZ 1 to the AZ 4.

TABLE 4

| Numbers of the AZs | Statuses of the AZs |
| --- | --- |
| AZ 1 | Service available |
| AZ 2 | Service available |
| AZ 3 | Service available |
| AZ 4 | Service available |
| AZ 5 | Service unavailable |
| AZ 6 | Service unavailable |

In another example, the DNS may store a status of the AZ in the correspondence between a domain name and an AZ(s). As shown in Table 5, the status of each AZ is further indicated behind the AZ. For example, in Table 5, a status of the AZ 1 corresponding to the domain name 3 is the service available state, a status of the AZ 2 corresponding to the domain name 3 is the service available state, and a status of the AZ 3 corresponding to the domain name 3 is the service unavailable state.

TABLE 5

| Domain names | Numbers and statuses of the AZs |
| --- | --- |
| Domain name 1 | AZ 6 (service available) |
| Domain name 2 | AZ 4 (service available) and AZ 5 (service unavailable) |
| Domain name 3 | AZ 1 (service available), AZ 2 (service available), and AZ 3 (service unavailable) |

In another example, the DNS may update the correspondence between a domain name and an AZ(s) based on a status of the AZ or statuses of the AZs, so that only an AZ in the service available state is stored in the correspondence between a domain name and an AZ(s). For example, AZs configured by the DNS for the domain name 3 are the AZ 1 to the AZ 3. After obtaining the status of each AZ, the DNS determines that the AZ 3 is in the service unavailable state. In this case, the DNS temporarily deletes the AZ 3 from a list of the correspondence between a domain name and an AZ(s), and in the correspondence between a domain name and an AZ(s), the AZs corresponding to the domain name 3 change from the AZ 1 to the AZ 3 to the AZ 1 and the AZ 2, as shown in Table 6. Therefore, all AZs included in the list of correspondences between domain names and AZs are AZs in the service available state.

TABLE 6

| Domain names | Numbers of the AZs |
|---|---|
| Domain name 1 | AZ6 |
| Domain name 2 | AZ4 |
| Domain name 3 | AZ 1 and AZ 2 |

It should be noted that, after the DNS obtains the status of each AZ again and determines that the AZ deleted from the list of the correspondence between a domain name and an AZ(s) is in the service available state, the DNS may update the correspondence between a domain name and an AZ(s) again, to add the AZ to the correspondence between a domain name and an AZ(s). Using an example in which the AZ 3 changes from the service unavailable state to the service available state, in the correspondence between a domain name and an AZ(s), the AZs corresponding to the domain name 3 change from the AZ 1 and the AZ 2 shown in Table 6 to the AZ 1 to the AZ 3.

For example, the DNS obtains the status of each AZ, and updates the correspondence between a domain name and an AZ(s) based on the status of the AZ. After obtaining the updated correspondence between a domain name and an AZ(s), the DNS determines the first AZ from the updated correspondence between a domain name and an AZ(s). For example, the updated correspondence between a domain name and an AZ(s) is shown in Table 6. If the DNS determines that the AZs corresponding to the domain name 3 are the AZ 1 and the AZ 2, the DNS randomly selects one of the AZ 1 and the AZ 2 as the first AZ.

The first AZ determined in any one of the foregoing four manners is an AZ in the service available state. Therefore, as long as the client sends a domain name resolution request to the DNS, the DNS returns an available AZ to the client if at least one AZ corresponding to the domain name is in a service available state. In this way, the client is not aware of a fault of an AZ, certainly there is no need for operation and maintenance personnel to manually switch the AZ, and the client does not need to make repeated attempts to find a usable AZ. This can reduce a delay caused by the fault of the AZ and increase system reliability and availability.

Fifth Manner:

The DNS first determines, based on the correspondence between a domain name and an AZ(s), that AZs corresponding to the domain name 3 are the AZ 1, the AZ 2, and the AZ 3. Then, the DNS obtains a status of each of a plurality of AZs (namely, the AZ 1 to the AZ 3) corresponding to the domain name 3, and determines, according to a preset policy from the AZ 1 to the AZ 3, a first AZ in the service available state. The preset policy may be at least one factor of distances between the client and AZs that are in the service available state and that are in the plurality of AZs, a priority of the client, and loads of the AZs that are in the service available state and that are in the plurality of AZs.

The DNS may determine, in one of the foregoing manners, the status of each of the plurality of AZs corresponding to the domain name 3. Details are not described herein. For different policies, the following separately describes a process in which the DNS determines the first AZ.

In a first policy, in the storage system with a plurality of AZs, a distance between AZs is generally comparatively long, for example, usually 50 kilometers to 100 kilometers. Consequently, distances between the client and different AZs vary greatly. Therefore, the DNS may determine the first AZ based on the distances between the client and AZs that are in the service available state and that are in the plurality of AZs. The following is a specific implementation.

The DNS first obtains an IP address of the client. Then, the DNS calculates, based on the IP address of the client and IP addresses of the AZs that are in the service available state and that are in the plurality of AZs corresponding to the domain name, a distance between the client and each of the AZs that are in the service available state and that are in the plurality of AZs, and determines an AZ closest to the client as the first AZ.

In an example, using an example in which the IP address of the client is 10.64.0.4, AZs that are in the service available state and that are in the AZ 1 to the AZ 3 corresponding to the domain name 3 are the AZ 1 and the AZ 2, an IP address of the AZ 1 is 10.64.0.0/10, and an IP address of the AZ 2 is 10.128.0.0/10, the DNS may determine the distance between the client and each AZ based on a distance routing score value, where the distance routing score value may be 0 or 1. When the distance routing score value is 1, it indicates that the client is comparatively close to the AZ. When the distance routing score value is 0, it indicates that the client is comparatively far from the AZ. For example, if the IP address of the client is an IP address in a subnet of an AZ, a distance routing score value between the client and the AZ is 1. If the IP address of the client is not the IP address in the subnet of the AZ, the distance routing score value between the client and the AZ is 0. In this embodiment of the present disclosure, it can be learned from the IP address of the client and the IP address of the AZ 1 that the IP address of the client is an IP address of a subnet in the AZ 1. Therefore, a distance routing score value between the client and the AZ 1 is 1. However, the IP address of the client is not an IP address of any subnet in the AZ 2. Therefore, a distance routing score value between the client and the AZ 2 is 0. An AZ closest to the client is the AZ 1, and therefore the AZ 1 is determined as the first AZ.

Certainly, the distance between the client and the AZ may alternatively be calculated in another way. This is not limited herein.

According to the foregoing technical solution, the DNS may select the AZ closest to the client and feed back the AZ to the client for use. This can reduce the distance between the client and the AZ, and further reduce a data transmission delay and further improve access performance.

In a second policy, to facilitate access management of the client, for example, a capability (performance) of an AZ accessed by the client may be matched with the priority of the client, so that a client with a higher priority level may access an AZ with a stronger capability (good performance).

Therefore, the DNS may determine the first AZ based on a priority level of the client. The following is a specific implementation.

The DNS selects, based on the priority of the client and performance of AZs that are in a service available state and that are in a plurality of AZs corresponding to a domain name to be accessed by the client, an AZ that matches the priority of the client from the AZs that are in the service available state and that are in the plurality of AZs as the first AZ.

It should be noted that, the AZ that matches the priority of the client may be understood as that a higher priority level of the client indicates better performance of the AZ that matches the client. This is not limited in this embodiment of the present disclosure.

In an example, the DNS may pre-use a Config.setPriority interface used to set the priority level of the client to set a priority level for each client that communicates with a storage system with a plurality of AZs. For example, all the clients may be classified into two priority levels: a high priority level and a low priority level. A priority level of a client that requires a low delay is set to the high priority level, for example, a client configured to provide video data. A priority level of a client that does not require a delay is set to the low priority level. Certainly, all the clients may alternatively be classified into a plurality of priority levels based on use requirements. For example, the plurality of priority levels may include three priority levels: a high priority level, a medium priority level, and a low priority level, or five priority levels: a high priority level, a comparatively high priority level, a medium priority level, a comparatively low priority level, and a low priority level. This is not limited in this embodiment of the present disclosure.

After receiving the domain name resolution request sent by the client, the DNS may obtain the priority level of the client through a Config.getPriority interface configured to query the set priority of the client.

In an example, using an example in which the DNS determines that the priority level of the client is high, the AZs that are in the service available state and that are in the AZ 1 to the AZ 3 corresponding to the domain name 3 are the AZ 1 and the AZ 2, performance of the AZ 1 is better than performance of the AZ 2, and a policy is that a higher priority level of the client indicates better performance of the AZ that matches the client, the DNS determines, based on the policy, that the AZ 1 is the AZ that matches the priority level of the client, thereby determining that the AZ 1 is the first AZ.

In another example, the DNS may alternatively classify performance of AZs. For example, the DNS may classify the performance of the AZs at a processing speed of the AZ, determine that performance of an AZ whose processing speed is less than 1 s is excellent, determine that performance of an AZ whose processing speed is between 1 s and 2 s is good, and determine that performance of an AZ whose processing speed is greater than 2 s is poor. Further, the DNS may set a matching relationship between the priority level of the client and the performance of the AZ. For example, the client with a higher priority level matches the AZ with excellent or good performance, and a client with a lower priority level matches the AZ with poor performance. Using an example in which the DNS determines that the priority level of the client is high, the AZs that are in the service available state and that are in AZ 1 to AZ 3 corresponding to the domain name 3 are the AZ 1 and the AZ 2, the performance of the AZ 1 is excellent, and the performance of the AZ 2 is good, the DNS determines, based on the preset matching relationship between the priority level of the client and the performance of the AZ, that the performance of the AZ that matches the client is excellent or good, and both the AZ 1 and the AZ 2 are AZs that match the client. Therefore, either the AZ 1 or the AZ 2 may be selected as the first AZ.

According to the foregoing technical solution, the DNS may allocate AZs with different performance to clients based on different priority levels of the clients. For example, an AZ with good performance is preferentially allocated to a client with a higher priority level for access. This can improve a storage system hierarchical capability and client performance. Further, because the DNS sets different priority levels for the clients, a plurality of clients may be allocated to different AZs by dividing the priority levels for access. This can reduce a probability of breakdown caused by an excessively large access volume of an AZ, and increase stability of the storage system.

In a third policy, to implement load balancing of the AZs in the storage system, the DNS may determine the first AZ based on the load of each of the plurality of AZs that are in the service available state and that correspond to the domain name to be accessed by the client. The following is a specific implementation.

In an example, the DNS first determines the load of each of the plurality of AZs that are in the service available state and that correspond to the domain name to be accessed by the client, and then determines, from the plurality of AZs, an AZ whose load is less than a threshold as the first AZ. A manner in which the DNS obtains the load of each AZ is the same as that in the second case in the second manner, and details are not described herein. For example, the AZs that are in the service available state and that are in the AZ 1 to the AZ 3 corresponding to the domain name 3 to be accessed by the client are the AZ 1 and the AZ 2, a load of the AZ 1 is 50%, a load of the AZ 2 is 70%, and the threshold is 60%. Because the load of the AZ 1 is 50%<60%, and the load of the AZ 2 is 70%>60%. Therefore, the DNS determines the AZ 1 as the first AZ.

In another example, the DNS first determines the load of each of the plurality of AZs that are in the service available state and that correspond to the domain name to be accessed by the client, and then determines, from the plurality of AZs, an AZ with a minimum load as the first AZ. A manner in which the DNS obtains the load of each AZ is the same as that in the second case in the second manner, and details are not described herein. For example, the AZs that are in the service available state and that are in the AZ 1 to the AZ 3 corresponding to the domain name 3 to be accessed by the client are the AZ 1 and the AZ 2, a load of the AZ 1 is 50%, and a load of the AZ 2 is 70%. Because 50%<70%, the AZ 1 is the AZ with a minimum load, and the DNS determines the AZ 1 as the first AZ.

According to the foregoing technical solution, the DNS may reasonably regulate an access amount of each AZ based on the load of the AZ in the storage system. This can reduce a probability of breakdown caused by an excessively large access volume of an AZ, and increase stability of the storage system.

In a fourth policy, to provide an optimal AZ for the client, the DNS may combine three factors: the distances between the client and AZs that are in the service available state and that are in the plurality of AZs, the priority of the client, and the loads of the AZs that are in the service available state and that are in the plurality of AZs, to determine the first AZ together. The following is a specific implementation.

The DNS may determine a weight for each factor. A value of the weight may be adjusted based on a usage requirement, an actual deployment scale, or an actual test value. For example, if the client is close to each AZ in the storage system and a performance difference between the AZs in the storage system is comparatively small, both a weight for the factor of the distances between the client and AZs that are in the service available state and that are in the plurality of AZs and a weight value for the factor of the priority of the client may be set to a comparatively small value, for example, 0.2. A weight value for the factor of the loads of the AZs that is in the service available state and that are in the plurality of AZs is set to 0.6. Alternatively, if it is found, through experiment, that a distance between an AZ used by the client and the client has a greatest impact on performance of the client, the weight for the factor of the distances between the client and AZs that are in the service available state and that are in the plurality of AZs may be set to a relatively large value, for example, 0.6. Then, the weight values of the other two factors are randomly allocated. This is not limited in this embodiment of the present disclosure.

Then, the DNS may calculate the first AZ by using the following formula:

The first AZ=MAX $(\Sigma_{i=0}^{n} x_i y_i)$, where $x_i$ is a weighting item, and a value of i is 1, 2, or 3. When i is 1, it indicates a weighting item of a distance between the client and each of the plurality of AZs. When i is 2, it indicates a weighting item for matching the priority of the client with performance of the plurality of AZs. When i is 3, it indicates a weighting item for matching based on loads of the plurality of AZs, $y_i$ is a weight of the corresponding $x_i$, and a value of n is 3.

According to the foregoing technical solution, the DNS determines the first AZ with reference to a plurality of factors, so that a matching degree between the first AZ and the client can be optimal, and reliability of the storage system can be increased.

Step 404: The DNS sends an internet protocol IP address of the first AZ to the client.

After determining the first AZ, the DNS feeds back a domain name resolution result to the client. For example, after determining that the first AZ is the AZ 1, the DNS feeds back the IP address of the AZ 1, namely, the IP address 1, to the client.

Step 405: The client receives the IP address and sends an access request to the IP address.

In this embodiment of the present disclosure, if the access request is an access request for storage data, the client sends to-be-stored video data to the AZ 1.

Step 406: The AZ 1 receives the access request and processes the access request.

After receiving the to-be-stored video data sent by the client, the AZ 1 may first determine whether storage space of the AZ 1 is sufficient or determine whether a local temporary fault occurs. If the storage space of the AZ 1 is sufficient to store the video data or no local temporary fault occurs in the AZ 1, the AZ 1 stores the video data.

If the AZ 1 determines that the storage space of the AZ 1 cannot store the video data or determines that the local temporary fault occurs, the AZ 1 may forward the video data to another AZ, for example, forward the video data to the AZ 2 used to store video data. After completing storage, the AZ 2 feeds back storage completion information to the AZ 1.

Step 407: The AZ 1 feeds back a processing result to the client.

After storing the video data, the AZ 1 returns the storage completion information to the client, to complete this access.

It should be noted that step 405 to step 407 are optional steps, in other words, are not mandatory.

In the foregoing technical solution, the domain name system DNS processes the domain name resolution request sent by the client. After receiving the domain name resolution request sent by the client, the DNS feeds back, to the client, an IP address of an AZ in the service available state and that corresponds to the domain name resolution request. In this way, the client is not aware of a fault of an AZ, certainly there is no need for operation and maintenance personnel to manually switch the AZ, and the client does not need to make repeated attempts to find a usable AZ. This can reduce a delay caused by the fault of the AZ and increase service continuity.

Further, the DNS may alternatively select, by using a plurality of policies, the optimal AZ for the client for access of the client. This can increase reliability and availability of the storage system.

In the foregoing embodiments provided in the present disclosure, the methods provided in the embodiments of the present disclosure are separately described from perspectives of the domain name system DNS, the client, and interaction between the domain name system DNS and the client. To implement functions in the methods provided in the embodiments of the present disclosure, the domain name system DNS may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on a specific application and a design constraint condition of the technical solutions.

Figure 5:
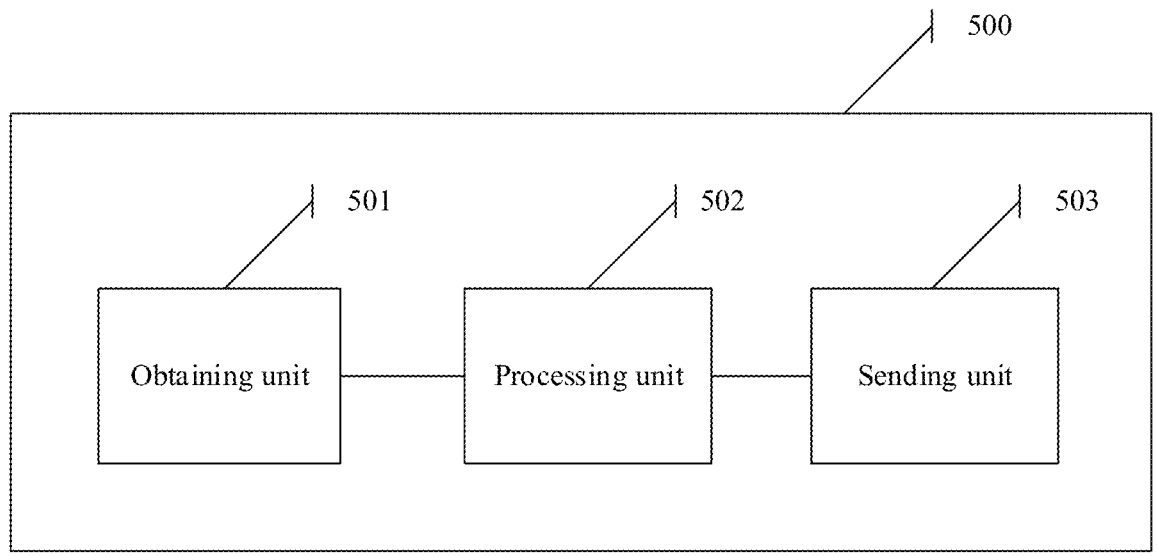
FIG. 5 is a schematic structural diagram of a domain name resolution apparatus based on a plurality of availability zones AZ according to an embodiment of the present disclosure.

FIG. 5 is a schematic structural diagram of a domain name resolution apparatus 500 based on a plurality of availability zones (AZ). The domain name resolution apparatus 500 may be a domain name system (DNS), and can implement functions of the DNS in the methods provided in the embodiments of the present disclosure. The domain name resolution apparatus 500 may alternatively be an apparatus that can support a DNS in implementing functions of the DNS in the methods provided in the embodiments of the present disclosure. The domain name resolution apparatus 500 may be a hardware structure, a software module, or a combination of a hardware structure and a software module. The domain name resolution apparatus 500 may be implemented by a chip system. In this embodiment of the present disclosure, the chip system may include a chip, or may include a chip and another discrete component.

The domain name resolution apparatus 500 may include an obtaining unit 501, a processing unit 502, and a sending unit 503.

The obtaining unit 501 may be configured to perform step 402 in the embodiment shown in FIG. 4, and/or configured to support another process of the technology described in this specification. The obtaining unit 501 is configured by the domain name resolution apparatus 500 to communicate with another module, and may be a circuit, a component, an interface, a bus, a software module, a transceiver, or any other apparatus that can implement communication.

The processing unit 502 may be configured to perform step 403 in the embodiment shown in FIG. 4, and/or configured to support another process of the technology described in this specification.

The sending unit 503 may be configured to perform step 404 in the embodiment shown in FIG. 4, and/or configured to support another process of the technology described in this specification. The sending unit 503 is configured by the domain name resolution apparatus 500 to communicate with another module, and may be a circuit, a component, an interface, a bus, a software module, a transceiver, or any other apparatus that can implement communication.

All related content of the steps in the foregoing method embodiments may be cited in function descriptions of the corresponding functional modules. Details are not described herein.

In this embodiment of the present disclosure, division into the modules is an example, is merely logical function division and may be other division during actual implementation. In addition, functional modules in the embodiments of the present disclosure may be integrated into one processor, or each of the modules may exist alone physically, or at least two modules may be integrated into one module. The integrated module may be implemented in a form of hardware, or may be implemented in a form of a software functional module.

Figure 6:
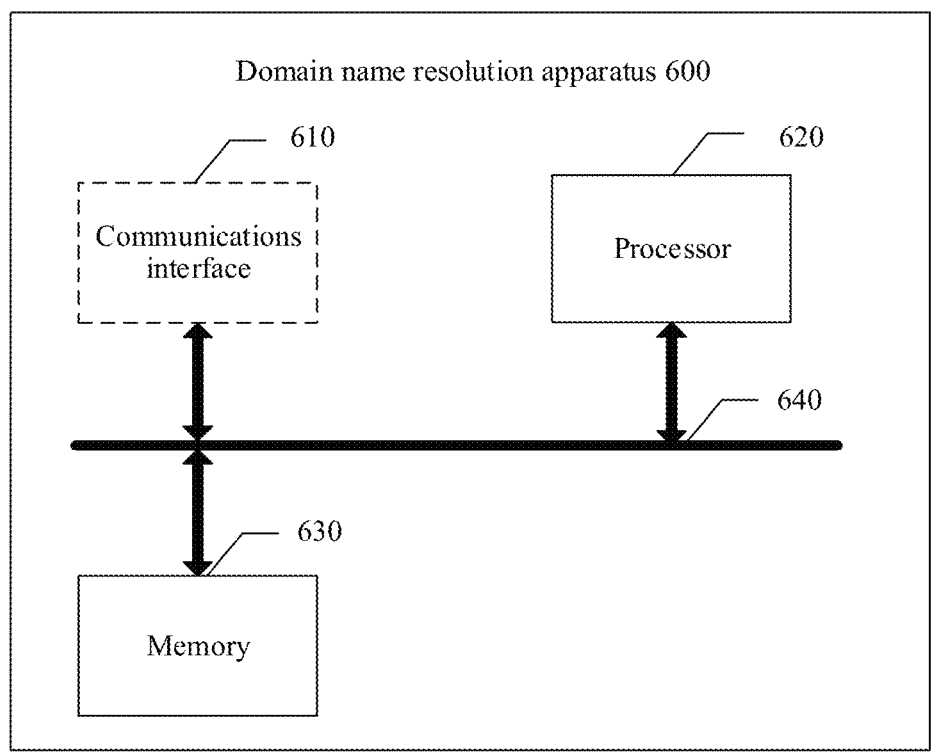
FIG. 6 is another schematic structural diagram of a domain name resolution apparatus based on a plurality of availability zones AZ according to an embodiment of the present disclosure.

FIG. 6 is a domain name resolution apparatus 600 based on a plurality of availability zones (AZ) according to an embodiment of the present disclosure. The domain name resolution apparatus 600 may be the domain name system (DNS) in the embodiment shown in FIG. 4, and can implement functions of the DNS in the method provided in the embodiment shown in FIG. 4 of the present disclosure. The domain name resolution apparatus 600 may alternatively be an apparatus that can support a DNS in implementing functions of the DNS in the method provided in the embodiment shown in FIG. 4 of the present disclosure. The domain name resolution apparatus 600 may be a chip system. In this embodiment of the present disclosure, the chip system may include a chip, or may include a chip and another discrete component.

The domain name resolution apparatus 600 includes at least one processor 620, configured to implement or support the domain name resolution apparatus 600 in implementing the functions of the DNS in the method provided in the embodiment shown in FIG. 4 of the present disclosure. For example, the processor 620 may determine, from a plurality of AZs corresponding to a domain name, a first AZ in a service available state. For details, refer to detailed descriptions in the method example. Details are not described herein.

The domain name resolution apparatus 600 may further include at least one memory 630, configured to store a program instruction and/or data. The memory 630 is coupled to the processor 620. Coupling in this embodiment of the present disclosure is an indirect coupling or a communication connection between apparatuses, units, or modules, may be in an electrical form, a mechanical form, or another form, and is used for information exchange between the apparatuses, the units, or the modules. The processor 620 may cooperate with the memory 630. The processor 620 may execute the program instruction stored in the memory 630. At least one program instruction of the at least one memory may be included in the processor. When executing the program instruction in the memory 630, the processor 620 can implement the method shown in FIG. 4.

The domain name resolution apparatus 600 may further include a communications interface 610, configured to communicate with another device by using a transmission medium, so that an apparatus used in the domain name resolution apparatus 600 may communicate with the another device. For example, the another device may be a client. The processor 620 may send and receive data through the communications interface 610.

A specific connection medium among the communications interface 610, the processor 620, and the memory 630 is not limited in this embodiment of the present disclosure. In this embodiment of the present disclosure, the memory 630, the processor 620, and the communications interface 610 are connected by using a bus 640 in FIG. 6. The bus is represented by using a bold line in FIG. 6. A manner of a connection between other components is merely an example for description, and imposes no limitation. The bus may be classified into an address bus, a data bus, a control bus, and the like. For ease of representation, only one bold line is used to represent the bus in FIG. 6, but this does not mean that there is only one bus or only one type of bus.

In this embodiment of the present disclosure, the processor 620 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of the present disclosure. The general-purpose processor may be a microprocessor, any conventional processor, or the like. The steps of the methods disclosed with reference to the embodiments of the present disclosure may be directly performed by a hardware processor, or may be performed by using a combination of hardware in the processor and a software module.

In this embodiment of the present disclosure, the memory 630 may be a nonvolatile memory, such as a hard disk drive (HDD) or a solid-state drive (SSD), or may be a volatile memory, such as a random-access memory (RAM). The memory is any other medium that can carry or store expected program code in a form of an instruction or a data structure and that can be accessed by a computer, but is not limited thereto. The memory in this embodiment of the present disclosure may be alternatively a circuit or any other apparatus that can implement a storage function, and is configured to store the program instruction and/or the data.

An embodiment of the present disclosure further provides a computer-readable storage medium including an instruction. When the instruction is run on a computer, the computer is enabled to perform the method performed by the DNS in the embodiment shown in FIG. 4.

An embodiment of the present disclosure further provides a computer program product including an instruction. When the instruction is run on a computer, the computer is enabled to perform the method performed by the DNS in the embodiment shown in FIG. 4.

An embodiment of the present disclosure provides a chip system. The chip system includes a processor, and may further include a memory, to implement functions of the DNS in the foregoing methods. The chip system may include a chip, or may include a chip and another discrete component.

All or some of the methods in the embodiments of the present disclosure may be implemented by using software, hardware, firmware, or any combination thereof. When software is used to implement the methods, the methods may be implemented completely or partially in a form of a computer program product. The computer program product includes one or more computer instructions. When the computer instructions are loaded and executed on a computer, the procedure or the functions according to the embodiments of the present disclosure are completely or partially generated. The computer may be a general-purpose computer, a special-purpose computer, a computer network, a network device, a user device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

What is claimed is:

1. A domain name resolution method based on a plurality of availability zones (AZ), comprising:
receiving, by a domain name system (DNS), a domain name resolution request from a client, wherein the domain name resolution request comprises a domain name of a to-be-accessed resource, the domain name corresponds to a plurality of AZs, and each of the plurality of AZs is capable of providing the to-be-accessed resource;
determining, by the DNS, a status of each of the plurality of AZs, wherein the status comprises a service available state or a service unavailable state;
determining, by the DNS from the plurality of AZs, a first AZ in the service available state, wherein the first AZ is determined based on a weighted sum of multiple factors including at least two of: distances between the client and each of the plurality of AZs in the service available state, a priority of the client, or loads of each of the plurality of AZs in the service available state; and
sending, by the DNS, an internet protocol (IP) address of the first AZ to the client.

2. The method according to claim 1, wherein the determining, by the DNS, the status of each of the plurality of AZs comprises:
obtaining, by the DNS, at least one of a heartbeat packet/frame and the load of each AZ of the plurality of AZs in the service available state; and
determining, by the DNS, that a second AZ of the plurality of AZs is in the service unavailable state responsive to determining that the heartbeat packet/frame of the second AZ is not received within a preset duration and/or the load of the second AZ exceeds a preset load.

3. The method according to claim 1, wherein the determining, by the DNS, the first AZ in the service available state comprises:
obtaining, by the DNS, an IP address of the client; and
calculating, by the DNS based on the IP address of the client and IP addresses of the plurality of AZs in the service available state, the distance between the client and each of the plurality of AZs in the service available state.

4. The method according to claim 1, wherein the determining, by the DNS, the first AZ in the service available state comprises:
selecting, by the DNS, an AZ that matches the priority of the client as the first AZ.

5. The method according to claim 1, wherein the determining, by the DNS, the first AZ in the service available state comprises:
determining, by the DNS, the load of each of the plurality of AZs in the service available state; and
determining, by the DNS, an AZ whose load is less than a threshold as the first AZ.

6. A domain name resolution apparatus based on a plurality of availability zones (AZ), comprising:
a communications interface configured to receive a domain name resolution request from a client, wherein the domain name resolution request comprises a domain name of a to-be-accessed resource, the domain name corresponds to the plurality of AZs, and each of the plurality of AZs is capable of providing the to-be-accessed resource; and
a processor coupled to the communication interface and configured to:
determine a status of each of the plurality of AZs, wherein the status comprises a service available state or a service unavailable state, and
determine, from the plurality of AZs, a first AZ in a service available state, wherein the first AZ is determined based on a weighted sum of multiple factors including at least two of: distances between the client and each of the plurality of AZs in the service available state, a priority of the client, or loads of each of the plurality of AZs in the service available state;
wherein:
the communications interface is further configured to send an internet protocol (IP) address of the first AZ to the client.

7. The apparatus according to claim 6, wherein the processor is specifically configured to:
obtain at least one of a heartbeat packet/frame and the load of each of the plurality of AZs in the service available state; and
determine that a second AZ of the plurality of AZs is in the service unavailable state responsive to determining that the heartbeat packet/frame of the second AZ is not received within a preset duration and/or the load of the second AZ exceeds a preset load.

8. The apparatus according to claim 6, wherein the processor is specifically configured to:
obtain an IP address of the client; and
calculate, based on the IP address of the client and IP addresses of each of the plurality of AZs in the service available state, the distance between the client and each of the plurality of AZs in the service available state.

9. The apparatus according to claim 6, wherein the processor is specifically configured to:
select an AZ that matches the priority of the client as the first AZ.

10. The apparatus according to claim 6, wherein the processor is specifically configured to:
determine the load of each of the plurality of AZs in the service available state; and
determine an AZ whose load is less than a threshold as the first AZ.

11. The method according to claim 1, wherein an AZ corresponding with a maximum value of the weighted sum is determined as the first AZ.

12. The apparatus according to claim 6, wherein an AZ corresponding with a maximum value of the weighted sum is determined as the first AZ.

* * * * *